Sept. 27, 1927.
E. H. BELKNAP
1,643,617
FUEL TESTING APPARATUS
Filed Jan. 10, 1927
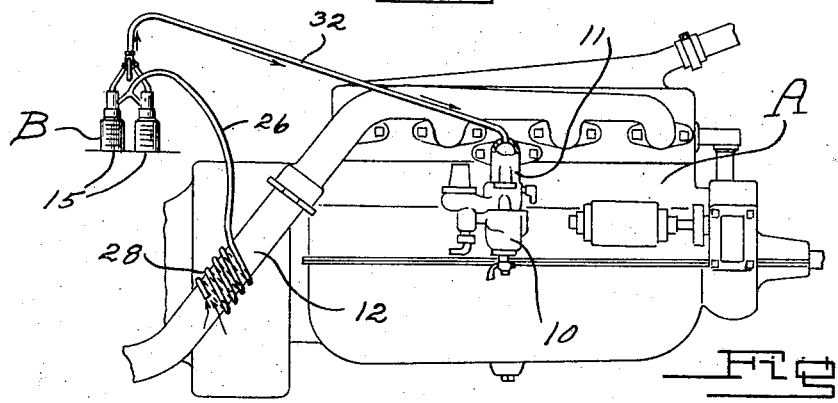
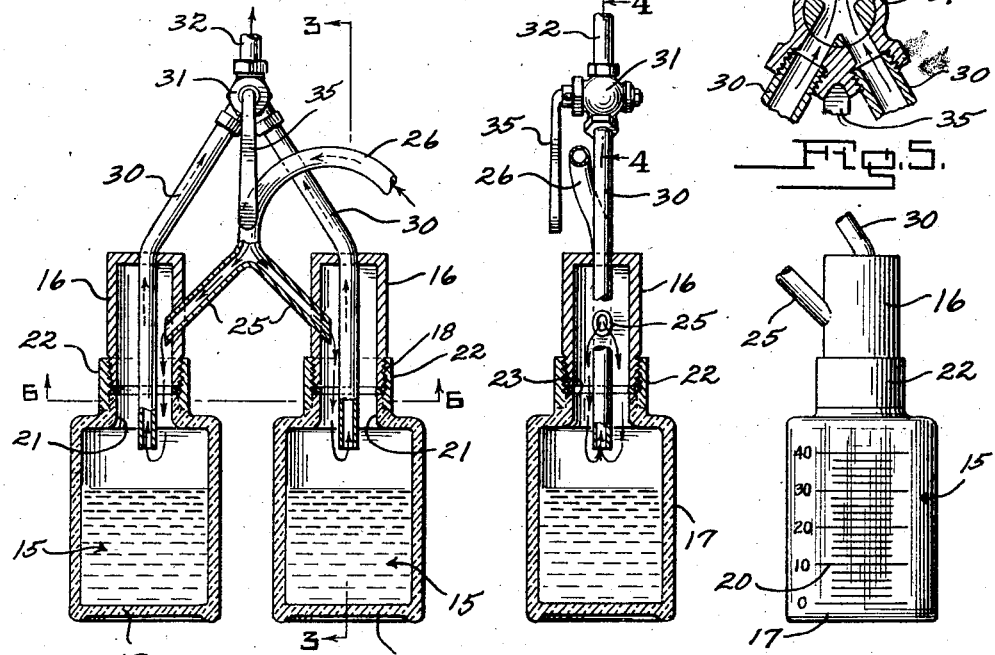
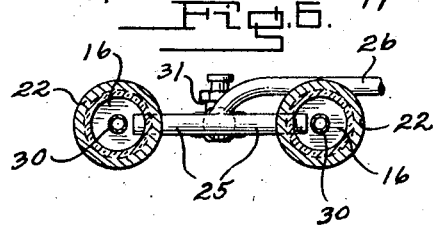
Edward H. Belknap
Inventor
By Lancaster and Allwine
Attorneys Patented Sept. 27, 1927.

1,643,617

UNITED STATES PATENT OFFICE.

EDWARD H. BELKNAP, OF WASHINGTON, DISTRICT OF COLUMBIA.

FUEL-TESTING APPARATUS.

Application filed January 10, 1927. Serial No. 160,293.

The present invention relates to fuel testing apparatus, and the primary object of the invention is to provide apparatus of this character primarily intended for use in determining the volatility of liquid fuel oils such as gasoline and the like.

A further object of the invention is to provide a novel fuel testing apparatus for determining the ratio of volatilization of different grades of fuel oils such as employed to form the explosive charges for the operation of internal combustion engines.

A further object of the invention resides in the provision of an improved fuel testing apparatus adapted for installation upon existing types of internal combustion engines and operable upon operation of the engine for determining the volatility of either a single or the ratio of volatilization of a number of fuels of different grades, or the ratio of volatilization of fuels with a liquid serving as a standard.

A still further object of the invention resides in the provision of an improved fuel testing apparatus as set forth, embodying two or more graduated liquid containers for receiving the fuel to be tested, and which containers are so mounted as to permit of ready comparison being made during volatilization of the liquids in the two containers.

A still further object of the invention resides in the provision of apparatus as set forth, embodying vaporizing chambers having inlet and outlet ports so arranged as to eliminate possibility of escape of any of the fuel being tested in its liquid form.

Other objects and advantages of the invention will be apparent during the course of the following detailed description, taken in connection with the accompanying drawing forming a part of this specification and in which drawing:

Figure 1 is a side elevation of a conventional type of internal combustion engine and showing one manner in which the improved fuel testing apparatus may be associated therewith.

Figure 2 is an enlarged detail view part in section and part in elevation of the apparatus.

Figure 3 is a vertical section on line 3—3 of Figure 2.

Figure 4 is an enlarged fragmentary section on line 4—4 of Figure 3.

Figure 5 is a side elevation of one of the vaporizing chambers and showing the graduations as appearing on the transparent fuel containers.

Figure 6 is a horizontal section on line 6—6 of Figure 2.

Referring to the drawing in detail, and wherein similar reference characters designate corresponding parts throughout the several views, the letter A designates a conventional type of internal combustion engine and B the improved fuel testing apparatus shown applied to the engine A.

The engine A and which is of conventional construction, embodies the usual carburetor 10 provided with the intake manifold 11, through which the explosive charge is drawn into the engine for operation thereof. The engine further embodies the usual exhaust pipe 12 through which the heated exhaust gases from the engine pass after explosion of the charges admitted through the intake manifold 11.

Referring now to the improved fuel testing apparatus B, the same embodies a pair of vaporizing chambers 15 which are of identical construction, and each of which embodies a dome like cap 16 and a fuel container 17. The dome like caps 16, and which are preferably formed of metal, may be mounted in any suitable manner and at any preferred location, and each cap is provided at its lower open end with external screw threads 18. These caps 16 are mounted with their lower open ends in a like horizontal plane and spaced a suitable distance apart so as to permit of ready attachment of the fuel containers 17.

The fuel containers 17, and each of which are preferably of like construction and configuration, are preferably formed of glass for rendering the containers transparent, and each container is provided with suitable graduations 20. Each transparent container 17 is preferably provided with a reduced neck portion 21 to which is secured in any suitable manner as by cementing or the like, an internally threaded sleeve 22 for threaded connection with the lower threaded ends of the dome like caps 16. These metal sleeves 22 provide shoulders 23 at the upper end of the neck portions 21 which abut with the lower ends of the caps 16 in a manner so that when the containers are threaded for their fullest extent upon the caps, the graduations of one of the transparent containers will align with the graduations of the companion transparent container. Thus it will be seen that the companion transparent containers are mounted in a like horizontal plane for permitting of a ready comparison being made between the liquids in the containers during volatilization of the liquids. When the fuel containers 17 are connected with their respective caps 16, it will be seen that independent vaporizing chambers 15 are provided for volatilization of the fuels to be tested.

Opening at a downwardly inclined angle into each of the dome like caps 16, are air inlet branches 25 which connect at their upper ends with a suitable air inlet tube 26 in a manner whereby air passing through the tube 26 is divided equally for passage through the branches 25 into the respective chambers 15. These branches 25 and tube 26 form an inverted Y and as will be observed in Figure 2, air passing through the downwardly inclined branches 25 is directed toward the surface of the liquid in the containers 17. It is preferred that the ends of the inlet branches 25 project past the inner surfaces of the caps 16 in a manner as illustrated in Figure 2 for preventing likelihood of any products of condensation adhering to the inner walls of the cap from entering the inlet branches.

The inlet tube 26 and which serves for the admitting of warm or heated air into the chambers 15, preferably has its end wound in a spiral about the exhaust pipe 12 as at 28, and this spirally wound portion 28 serves as a stove whereby when air is drawn through the open end of the tube and passes about the heated exhaust pipe 12, will be heated to a suitable degree before entrance into the chambers 15. While the tube 26 has been shown with its end wound spirally about the exhaust pipe 12 for providing a stove it will be apparent that if so desired the stove may be of any preferred construction for suitable heating of the air before being drawn to the chambers 15.

Projecting into each of the caps 16, and preferably extending concentrically thereof with their lower open ends extending for a suitable distance into the containers 17, are independent gas outlet branches or tubes 30 which are connected exteriorly of the caps by means of a three way valve 31, and connected with the opposite port of the three way valve 31, is a suction tube 32 the opposite end of which is connected with and opens into the intake manifold 11. This tube 32 during operation of the engine, serves for conveying of the vapor gases from the chambers 15 for mixture with the explosive charges being drawn through the intake manifold 11 from the carburetor 10. This suction created through the tube 32 upon operation of the engine, creates a suction through the air inlet tube 26 whereby warm air is drawn through the branches 25 into their respective chambers 15.

The three-way valve 31 is provided with a suitable handle 35 which may be operated for independent closing of either of the tubes 30, or closure of the outlet ports 36 for shutting off communication to the suction tube 32 when the testing apparatus is not being used.

In operation of the apparatus, the transparent containers 17 may be first removed from the supporting caps 16 and filled to the desired extent with the fuel to be tested and after which the containers may be threaded upon the respective caps for forming the sealed chambers 15. The engine A may then be set into operation and upon operation of the engine a suction is created in the intake manifold 11; and the exhaust pipe 12 becomes heated by reason of the exhaust gases passing therethrough. This suction in the intake manifold 11 creates a suction in the chambers 15 whereby warm air is drawn through the air inlet tube 26 and directed by reason of the branches 25 into the chambers 15 above the surface of the liquid being tested. The vapor being emitted from the liquid, and aided in the process of volatilization by means of the warm air being admitted through the branches 25, is drawn in equal amounts through the gas outlet tubes 30 into the suction tube 32 and from which said gases enter the intake manifold 11 and mix with the explosive charge being drawn from the carburetor 10.

Referring now to the especial application of the apparatus for determining the ratio of volatilization of different grades of fuel oils such as gasoline and the like, the apparatus may be operated in the following manner. Assuming that the caps 16 have been mounted as shown in Figure 2 and the air inlet tube 26 properly associated with the exhaust pipe 12 and the suction tube 32 connected with the intake manifold 11, the transparent fuel containers 17 are first removed from their supporting caps and each filled to a like degree with different grades of liquid fuel. The engine may then be placed in operation for determining the ratio of volatilization of the fuels for a set period by comparison being made between the liquid levels in the independent fuel containers. If the fuel in one of the containers is of a higher volatility than that of the fuel in the companion chamber, the liquid level of the container bearing the better grade of fuel will lower faster than that of the companion container and allow the operator to determine the ratio of volatilization of the different grades of fuel by the aid of the graduations 20. Since each of the chambers 15 are of like area, and each is provided with inlet and outlet tubes of like dimensions, it will be seen that the liquid in each chamber is acted upon equally for determining the volatility of the liquids.

In use of the apparatus for determining the volatility of a single grade of fuel oil, one of the containers 17 is removed and filled to a suitable degree with the fuel and then the valve 31 operated so that communication is cut off from the empty container and communication is only completed from the suction tube 32 to the container bearing the fuel to be tested. After a set period, the liquid level of the fuel may be obtained by the graduations 20 and then a comparison made with a liquid such as water, and serving as a standard for determining the ratio of volatilization between the fuel and a standard.

Again, the ratio of volatilization of fuels with a liquid serving as a standard, may be accomplished by placing the fuel to be tested in one of the containers and placing the liquid serving as a standard in the companion container.

While the apparatus has been shown as being applied to and operable upon operation of an internal combustion engine, it will be apparent that the apparatus may be operated under various other conditions in which a suction is created through the tube 32 and heated air drawn from a suitable source into the chambers 15.

Referring once more to Figure 2, it will be seen that the gas outlet tube 30 terminates above the liquid level in the containers 17, and that the branch inlet tubes 25 are directed toward the tubes 30 in a manner whereby the tubes 30 are retained in a heated condition for vaporization of any products of condensation which may have accumulated on the tubes.

It will of course be apparent that if so desired, any number of the vaporizing chambers 15 may be connected between the inlet and outlet tubes 26 and 32 respectively, so long as the warm air being drawn through the inlet tube 26 is divided equally into each of the chambers, and the suction tube 32 having outlet tubes of like dimensions connected with each of the chambers for the drawing of like quantities of vapor gases from each of the chambers.

From the foregoing description it will be apparent that a novel and efficient fuel testing apparatus has been provided for use in determining the volatility of liquid fuel and which apparatus is primarily intended for installation upon existing types of internal combustion engines and automatically operable upon operation of the engine for determining the volatility of either a single or the ratio of volatilization of a number of fuels of different grades, or the ratio of volatilization of fuels to a liquid serving as a standard. It will also be apparent that an improved fuel testing apparatus has been provided whereby ready comparison may be made between liquids contained in separate vessels, during volatilization of the liquids.

Changes in detail may be made to the specific form of the invention herein shown and described, as well as adaptation of the apparatus for determining the volatility of liquids of various other descriptions than that set forth, without departing from the spirit of the invention or the scope of the following claims:

I claim:

1. In apparatus of the class described, the combination of a chamber embodying a removable transparent graduated portion for receiving a liquid, an air inlet tube opening into the chamber above the level of the liquid contained in the graduated portion, and a suction tube connected with the chamber for withdrawal of gases therefrom.

2. In apparatus of the class described, the combination of a chamber provided with a transparent graduated portion for containing a volatile liquid, an air inlet tube opening into the chamber above the level of the liquid contained therein, means for heating the air prior to entrance into the chamber through the air inlet tube, and a suction outlet tube connected with the chamber for withdrawal of gases therefrom at a point below the opening of the air inlet tube into the chamber.

3. In a fuel testing apparatus, the combination with an internal combustion engine including intake and exhaust manifolds, of a chamber provided with a transparent graduated fuel receiving portion, an air inlet tube connected at one end into the chamber and having its opposite end coiled about the exhaust manifold of the engine, and a gas outlet tube connected at one end with the chamber and having communication with the intake manifold of the engine.

4. In a fuel testing apparatus, the combination with an internal combustion engine including intake and exhaust manifolds, of a chamber embodying a cap and a removable transparent fuel receiving portion, an air inlet tube opening at one end into the cap and having its opposite end coiled about the exhaust manifold of the engine, and a gas outlet tube connected at one end with the chamber and having communication with the intake manifold of the engine.

5. The combination with an internal combustion engine including intake and exhaust manifolds, of a fuel testing apparatus comprising a pair of similarly formed chambers each being provided with a transparent fuel receiving portion, an air inlet tube having a stove portion embracing said exhaust manifold and having branches opening one into each of said chambers, gas outlet tubes connected with each chamber, and a suction tube connecting the gas outlet tubes and opening into the intake manifold of the engine whereby a suction is created in said air inlet tube.

6. The combination with an internal combustion engine including intake and exhaust manifolds, of a fuel testing apparatus comprising a pair of similarly formed chambers embodying a pair of removable graduated fuel containers, an air inlet tube having a portion embracing said exhaust manifold and having a pair of similarly formed branches opening one into each of said chambers whereby air is equally divided upon entrance into the respective chambers, gas outlet tubes having passageways of like dimensions, connected one with each chamber, and a suction tube connecting the gas outlet tubes and opening into the intake manifold of the engine whereby a suction is created in the air inlet tube.

7. The combination with an internal combustion engine including intake and exhaust manifolds, of a fuel testing apparatus for determining the ratio of volatility of fuel oils, comprising a pair of vaporizing chambers each embodying a dome like cap and a removable transparent fuel container having graduations delineated thereon, an air inlet tube having a stove portion embracing said exhaust manifold and having branches opening one into each of said caps, gas outlet tubes connected one with each of said caps and having their open ends arranged above the liquid levels in the fuel containers, and a suction tube connecting the gas outlet tubes and opening into the intake manifold of the engine whereby the gases are equally removed from the chambers due to the suction created in the intake manifold.

8. The combination with an internal combustion engine including intake and exhaust manifolds, of a fuel testing apparatus for determining the ratio of volatilization of different grades of fuel oils, comprising a pair of dome like caps having open screw threaded lower ends, a pair of graduated transparent fuel containers for threaded connection below each cap with the graduations of one container aligning horizontally with the graduations of the companion container, an air inlet tube having a stove portion embracing said exhaust manifold and having branches opening at a downwardly inclined angle into each of said caps above the fuel containers, a pair of identically formed outlet tubes opening into each of said caps, and a suction tube connecting the gas outlet tubes and opening into the intake manifold of the engine whereby a suction is created in the air inlet tube for drawing warm air into said chambers.

9. The combination with an internal combustion engine including intake and exhaust manifolds, of a fuel testing apparatus for determining the ratio of volatilization of fuel oils to a liquid serving as a standard, comprising a pair of chambers of like capacity and each embodying a transparent graduated fuel receiving portion, an air inlet tube having one end coiled about said exhaust manifold and having similarly formed branches provided at its opposite end opening one into each of said chambers adjacent the upper portions thereof, gas outlet tubes of like formation, projecting one into each of said chambers and having their open ends disposed below the inlet openings of the branches of said air inlet tube, a three way valve connecting the outer end of the gas outlet tubes, and a suction tube connected at one end with said three way valve and having its opposite end opening into the intake manifold of the engine for drawing off equal quantities of gas from each of said chambers upon operation of the engine.

EDWARD H. BELKNAP.